US008516460B2

(12) United States Patent
Bates et al.

(10) Patent No.: US 8,516,460 B2
(45) Date of Patent: Aug. 20, 2013

(54) REAL-TIME TEMPERATURE SENSITIVE MACHINE LEVEL CODE COMPILATION AND EXECUTION

(75) Inventors: Cary L. Bates, Rochester, MN (US); Nicholas P. Johnson, Rochester, MN (US); Justin K. King, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 196 days.

(21) Appl. No.: 13/196,182

(22) Filed: Aug. 2, 2011

(65) Prior Publication Data
US 2013/0036410 A1 Feb. 7, 2013

(51) Int. Cl.
G06F 9/44 (2006.01)
G06F 9/45 (2006.01)
G06F 21/00 (2006.01)
G06F 1/00 (2006.01)
G06F 3/00 (2006.01)
G01K 3/00 (2006.01)

(52) U.S. Cl.
USPC ........... 717/148; 702/130; 702/136; 711/165; 713/300; 713/322; 715/703; 717/100; 717/153

(58) Field of Classification Search
None
See application file for complete search history.

(56) References Cited

U.S. PATENT DOCUMENTS

| | | | | |
|---|---|---|---|---|
| 5,452,401 | A * | 9/1995 | Lin | 713/322 |
| 7,275,012 | B2 * | 9/2007 | Hermerding, II | 702/136 |
| 7,490,017 | B2 * | 2/2009 | Aguilar et al. | 702/130 |
| 2005/0216222 | A1 * | 9/2005 | Inoue | 702/136 |
| 2005/0216775 | A1 * | 9/2005 | Inoue | 713/300 |
| 2005/0240897 | A1 * | 10/2005 | Kailas | 717/100 |
| 2007/0260893 | A1 * | 11/2007 | Aguilar et al. | 713/300 |
| 2007/0260894 | A1 * | 11/2007 | Aguilar et al. | 713/300 |
| 2007/0260895 | A1 * | 11/2007 | Aguilar et al. | 713/300 |
| 2008/0120485 | A1 * | 5/2008 | Rothman et al. | 711/165 |
| 2011/0126098 | A1 * | 5/2011 | Jellison, Jr. | 715/703 |
| 2011/0154309 | A1 * | 6/2011 | Sazegari et al. | 717/153 |

OTHER PUBLICATIONS

Omer Khan et al., A Framework for Predictive Dynamic Temperature Management of Microprocessor Systems, IEEE 2008, [Retrieved on Dec. 3, 2012]. Retrieved from the internet: <URL: http://ieeexplore.ieee.org/stamp/stamp.jsp?tp=&arnumber=4681583> 6 Pages (258-263).*

(Continued)

Primary Examiner — Don Wong
Assistant Examiner — Anibal Rivera
(74) Attorney, Agent, or Firm — Biggers & Ohanian LLP

(57) ABSTRACT

Methods, apparatuses, and computer program products for real-time temperature sensitive machine level code compilation and execution are provided. Embodiments include compiling and executing, by a just-in-time (JIT) compiler, machine level code; during execution of the machine level code, determining, by the JIT compiler, an execution temperature for the machine level code, including reading temperature measurements from one or more processor temperature sensors; based on the determined execution temperature, identifying, by the JIT compiler, a portion of the machine level code that, when executed, caused temperature measurements of one or more processor temperature sensors to exceed a predetermined threshold temperature; recompiling, by the JIT compiler, the machine level code including modifying the identified portion to generate a new execution temperature that is lower than the previously determined execution temperature; and executing, by the JIT compiler, the recompiled machine level code.

11 Claims, 6 Drawing Sheets

(56) References Cited

OTHER PUBLICATIONS

Kevin Skadron et al., Temperature-Aware Microarchitecture: Modeling and Implementation, 2004 ACM Transactions on Architecture and Code Optimization, [Retrieved on Dec. 3, 2012]. Retrieved from the internet: <URL: http://dl.acm.org/citation.cfm?id=980157> 32 Pages (94-125).*

Basten et al., "Thermal-Aware Scratchpad Memory Design and Allocation", *2010 IEEE International Conference on Computer Design (ICCD)*, Oct. 3, 2010, Digital Object Identifier: 10.1109/ICCD.2010.5647616.

Kim et al., "Temperature-Aware Compilation for VLIW Processors", *13th IEEE Conference on Embedded and Real-time Computing Systems and Applications (RTCSA 2007)*, pp. 426-431, Aug. 2007.

Atienza et al., "Thermal-Aware Data Flow Analysis," *Design Automation Conference, 2009 (DAC '09. 46th ACM/IEEE*, pp. 613-614, Jul. 2009.

Atienza et al., "Thermal-Aware Compilation for System-On-Chip Processing Architectures", *Proceedings of the 20th symposium on Great Lakes symposium on VLSI*, Digital Object Identifier: 10.1145/1785481.1785535, pp. 221-226, 2010.

Orailoglu et al., "Processor Reliability Enhancement Through Compiler-Directed Register File Peak Temperature Reduction," *IEEE/IFIP International Conference on Dependable Systems & Networks, 2009. DSN '09*, Digital Object Identifier: 10.1109/DSN.2009.5270305, pp. 468-477, Jun. 2009.

\* cited by examiner

REAL-TIME TEMPERATURE SENSITIVE MACHINE LEVEL CODE COMPILATION AND EXECUTION

BACKGROUND OF THE INVENTION

1. Field of the Invention

The field of the invention is data processing, or, more specifically, methods, apparatuses, and computer program products for real-time temperature sensitive machine level code compilation and execution.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of development in computer systems is in the monitoring and control of computer processors to prevent degradation of processor performance and to promote the longevity of the processors in a system. For example, processors may now be implemented with one or more processor temperature sensors. In many current computer systems, fans and hardware throttling are employed to reduce processor temperature when the processor temperature sensors indicate that the temperature in a processor exceeds a predetermined temperature threshold. However, fans consume additional power and hardware throttling affects the performance of all processes executing on the processor.

SUMMARY OF THE INVENTION

Methods, apparatuses, and computer program products for real-time temperature sensitive machine level code compilation and execution are provided. Embodiments include compiling and executing, by a just-in-time (JIT) compiler, machine level code; during execution of the machine level code, determining, by the JIT compiler, an execution temperature for the machine level code, including reading temperature measurements from one or more processor temperature sensors; based on the determined execution temperature, identifying, by the JIT compiler, a portion of the machine level code that, when executed, caused temperature measurements of one or more processor temperature sensors to exceed a predetermined threshold temperature; recompiling, by the JIT compiler, the machine level code including modifying the identified portion to generate a new execution temperature that is lower than the previously determined execution temperature; and executing, by the JIT compiler, the recompiled machine level code.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
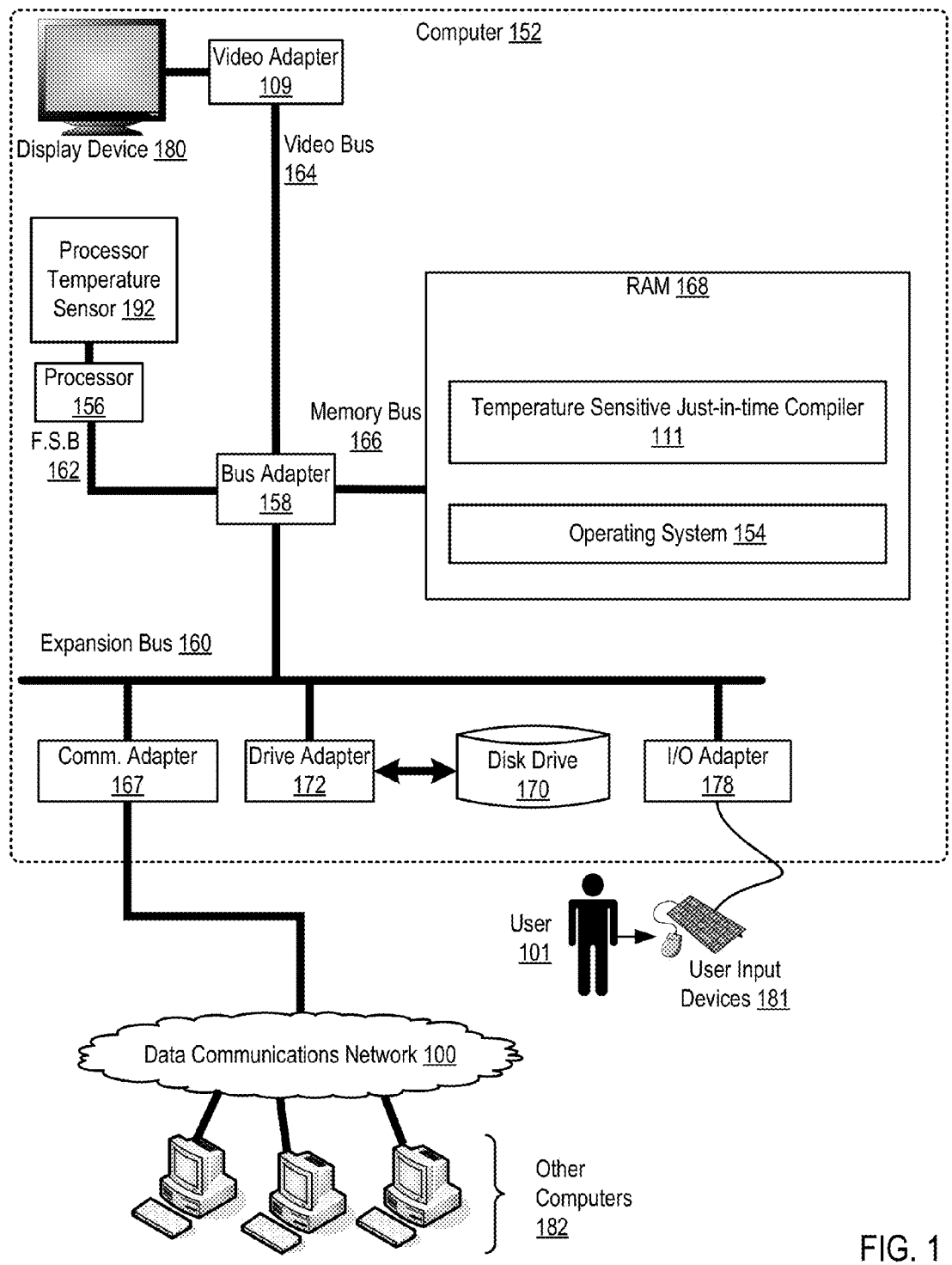
FIG. 1 sets forth a diagram of automated computing machinery comprising an exemplary computer useful in real-time temperature sensitive machine level code compilation and execution according to embodiments of the present invention.

Exemplary methods, apparatus, and products for real-time temperature sensitive machine level code compilation and execution in accordance with the present invention are described with reference to the accompanying drawings, beginning with FIG. 1. Real-time temperature sensitive machine level code compilation and execution in accordance with the present invention is generally implemented with computers, that is, with automated computing machinery. FIG. 1 sets forth a diagram of automated computing machinery comprising an exemplary computer (152) useful in real-time temperature sensitive machine level code compilation and execution according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a temperature sensitive just-in-time (JIT) compiler (111) that is configured to perform real-time temperature sensitive machine level code compilation and execution on the computer (152) according to embodiments of the present invention. In computing, just-in-time compilation (JIT), also known as dynamic translation, is a method to improve the runtime performance of computer programs. Traditionally, computer programs had two modes of runtime operation, either interpreted or static (ahead-of-time) compilation. Interpreted code is translated from a high-level language to a machine code continuously during every execution, whereas statically compiled code is translated into machine code before execution, and only requires this translation once. JIT compilers represent a hybrid approach, with translation occurring continuously, as with interpreters, but with caching of translated code to minimize performance degradation. Translated code also offers other advantages over statically compiled code at development time, such as handling of late-bound data types and the ability to enforce security guarantees. Several modern runtime environments, such as Microsoft's .NET Framework and most implementations of Java, rely on JIT compilation for high-speed code execution.

A temperature sensitive JIT compiler compiles machine level code based on temperature readings read from a processor temperature sensor (192). The temperature readings provide the compiler (111) with information that enables the compiler (111) to generate a sequence of machine level code that when executed by the processor (156) achieves a particular thermal effect.

Specifically, the JIT compiler (111) includes computer program instructions that when executed by the computer processor (156), cause the computer (152) to carry out the steps of: compiling and executing, by the JIT compiler, machine level code; during execution of the machine level code, determining, by the JIT compiler, an execution temperature for the machine level code, including reading temperature measurements from one or more processor temperature sensors; based on the determined execution temperature, identifying, by the JIT compiler, a portion of the machine level code that, when executed, caused temperature measurements of one or more processor temperature sensors to exceed a predetermined threshold temperature; recompiling, by the JIT compiler, the machine level code including modifying the identified portion to generate a new execution temperature that is lower than the previously determined execution temperature; and executing, by the JIT compiler, the recompiled machine level code.

Using a software implementation to cool the processor (156) enables a more precise level of control over processor (156) cooling. For example, performing hardware throttling impacts all processes executing on a processor whereas using software to cool the processor (156), the JIT compiler (111) may be able to decide what instructions are executed and which are not. Reducing temperature in the processor (156) reduces fan utilization which, in turn, reduces power consumption in the entire system.

Also stored in RAM (168) is an operating system (154). Operating systems useful real-time temperature sensitive machine level code compilation and execution according to embodiments of the present invention include UNIX™, Linux™, Microsoft XP™, AIX™, IBM's i5/OS™, and others as will occur to those of skill in the art. The operating system (154) and the JIT compiler (111) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for real-time temperature sensitive machine level code compilation and execution according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (109), which is an example of an I/O adapter specially designed for graphic output to a display device (180) such as a display screen or computer monitor. Video adapter (109) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for real-time temperature sensitive machine level code compilation and execution according to embodiments of the present invention include modems for wired dial-up communications, Ethernet (IEEE 802.3) adapters for wired data communications network communications, and 802.11 adapters for wireless data communications network communications.

Figure 2:
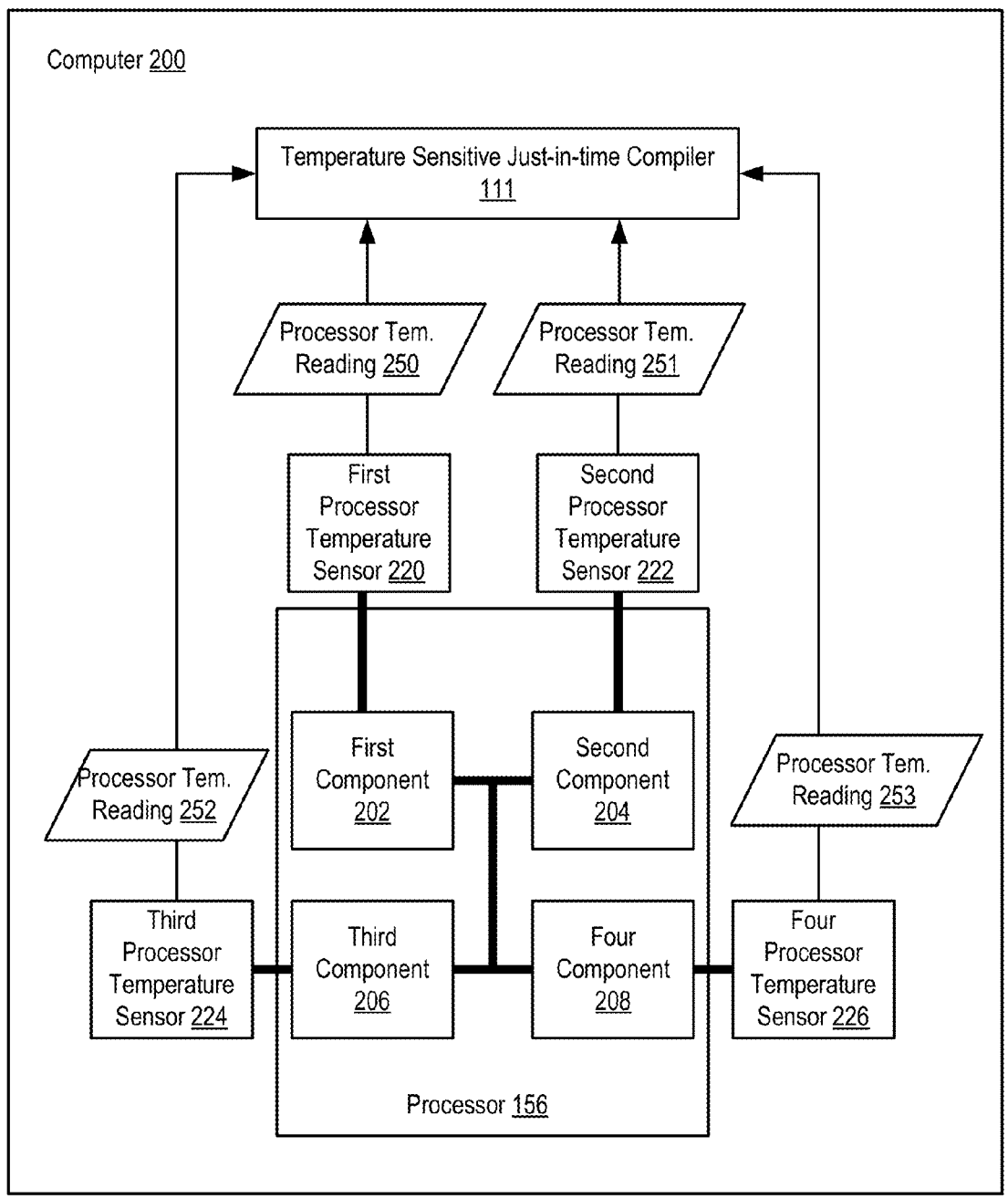
FIG. 2 sets forth a diagram of an example computer useful in real-time temperature sensitive machine level code compilation and execution according to embodiments of the present invention.

FIG. 2 sets forth a diagram of an example computer useful in real-time temperature sensitive machine level code compilation and execution according to embodiments of the present invention. The computer (200) of FIG. 2 is similar to the computer (152) of FIG. 1 in that the computer (200) of FIG. 2 also includes a processor (156) coupled to a compiler (111).

The processor (156) of FIG. 2 includes a first component (202), a second component (204), a third component (206), and a fourth component (208). A component of a processor is a digital circuit that performs operations for the processor. Examples of components may include an adder component, a multiplier component, and many others as will occur to those readers of skill in the art. Although four components are illustrated in FIG. 2, this is for example purposes only; readers of skill in the art will recognize that a processor may include any number of components that may be used in real-time temperature sensitive machine level code compilation and execution according to embodiments of the present invention.

The computer (200) of FIG. 2 also includes a first processor temperature sensor (220) to monitor a temperature of the first component (202) and provide a first temperature reading (250) to the compiler (111). A second processor temperature sensor (222) is included in the computer (200) to monitor a temperature of the second component (204) and provide a second temperature reading (251) to the compiler (111). The computer (200) also includes a third processor temperature sensor (224) to monitor a temperature of the third component (206) and provide a third temperature reading (252) to the compiler (111). The compiler (111) is configured to receive a fourth temperature reading (153) from a fourth processor temperature sensor (226) that monitors a temperature of the fourth component (208).

Particular components of the processor (156) may produce more heat than other components of the processor (156). That is, machine code executing within the processor (156) may cause one component to heat more than other components. The compiler (111) may utilize the temperature readings (250-253) to determine which machine code instructions cause which components to heat up and how that impacts execution temperatures of portions of machine code that are executed on the processor (156). For example, if the first component (202) is a multiplier component and the second component (204) is an adder component, the compiler (111) may determine that the first component (202) generates more heat than the second component (204). If the processor (156) is generating too much heat in the multiplier component, the compiler (111) may instead utilize the adder component. In this example, performing some operations on the adder component may increase processor time but may reduce processor temperature, thus preventing hardware throttling or increased fan utilization.

Figure 3:
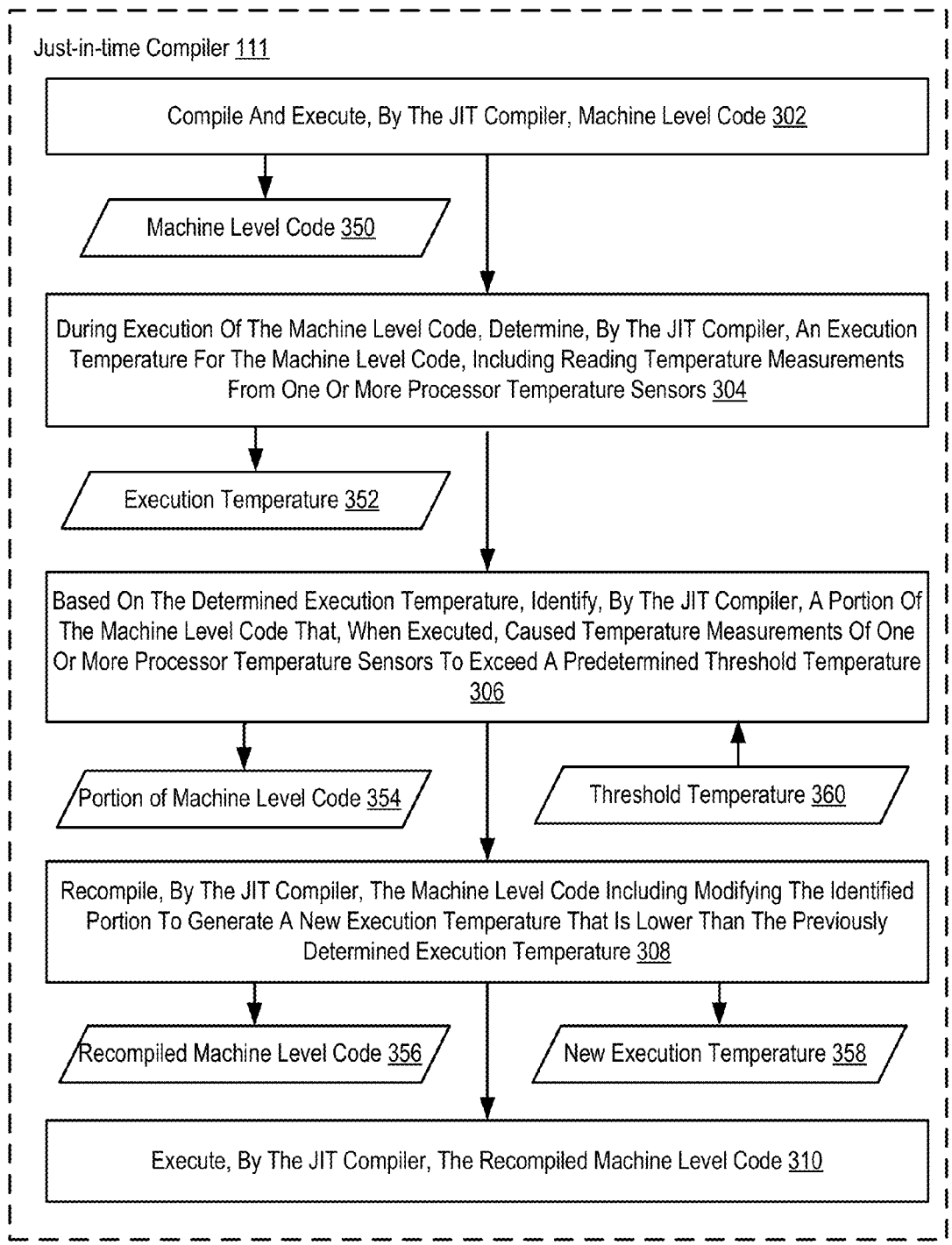
FIG. 3 sets forth a flow chart illustrating an exemplary method for real-time temperature sensitive machine level code compilation and execution according to embodiments of the present invention.

For further explanation, FIG. 3 sets forth a flow chart illustrating an exemplary method for real-time temperature sensitive machine level code compilation and execution according to embodiments of the present invention. The method of FIG. 3 includes compiling and executing (302), by a just-in-time (JIT) compiler (111), machine level code (350). Compiling and executing (302) machine level code (350) may be carried out by translating high level language code into machine level code. Machine level code includes system instructions and data that are executable directly by a computer's central processing unit. Machine level code may be regarded as a primitive programming language or as the lowest-level representation of a compiled and/or assembled computer program. Programs in interpreted languages are not represented by machine code, however, their interpreter (which may be seen as a processor executing the higher level program) often is. Machine code is sometimes called native code when referring to platform-dependent parts of language features or libraries.

The method of FIG. 3 also includes during execution of the machine level code (350), determining (304), by the JIT compiler (111), an execution temperature (352) for the machine level code (350), including reading temperature measurements from one or more processor temperature sensors. Determining (304) an execution temperature (352) for the machine level code (350), including reading temperature measurements from one or more processor temperature sensors may be carried out by receiving a plurality of temperature readings from the processor temperature sensors; determining which temperature readings correspond with the machine level code; and utilizing the determined temperature readings to create the execution temperature for the machine level code.

The method of FIG. 3 includes based on the determined execution temperature (352), identifying (306), by the JIT compiler (111), a portion (354) of the machine level code (350) that, when executed, caused temperature measurements of one or more processor temperature sensors to exceed a predetermined threshold temperature (360). Identifying (306) a portion (354) of the machine level code (350) that, when executed, caused temperature measurements of one or more processor temperature sensors to exceed a predetermined threshold temperature (360) may be carried out by corresponding a temperature reading with one or more machine level instructions of the machine level code; determining the impact of execution of each individual machine level instruction; and identifying the machine level instructions that generate the most heat.

The method of FIG. 3 also includes recompiling (308), by the JIT compiler (111), the machine level code (350) including modifying the identified portion (354) to generate a new execution temperature (358) that is lower than the previously determined execution temperature (352). Recompiling (308) the machine level code (350) including modifying the identified portion (354) to generate a new execution temperature (358) that is lower than the previously determined execution temperature (352) may be carried out by changing instructions within the portion of the machine level code. For example, the compiler may insert one or more machine level instructions that correspond with an underutilized component of the processor. Underutilized component may be cool and can be used in place of an overutilized component that is hot. Therefore, recompiled machine level code that utilizes the cool components instead of the hot components may reduce the temperature of the processor (156) without fan utilization or hardware throttles.

The method of FIG. 3 also includes executing (310), by the JIT compiler (111), the recompiled machine level code (356). Executing (310) the recompiled machine level code (356) may be carried out by triggering a sequence of actions within one or more components of the processor (156) in accordance with instructions within the machine level code.

Figure 4:
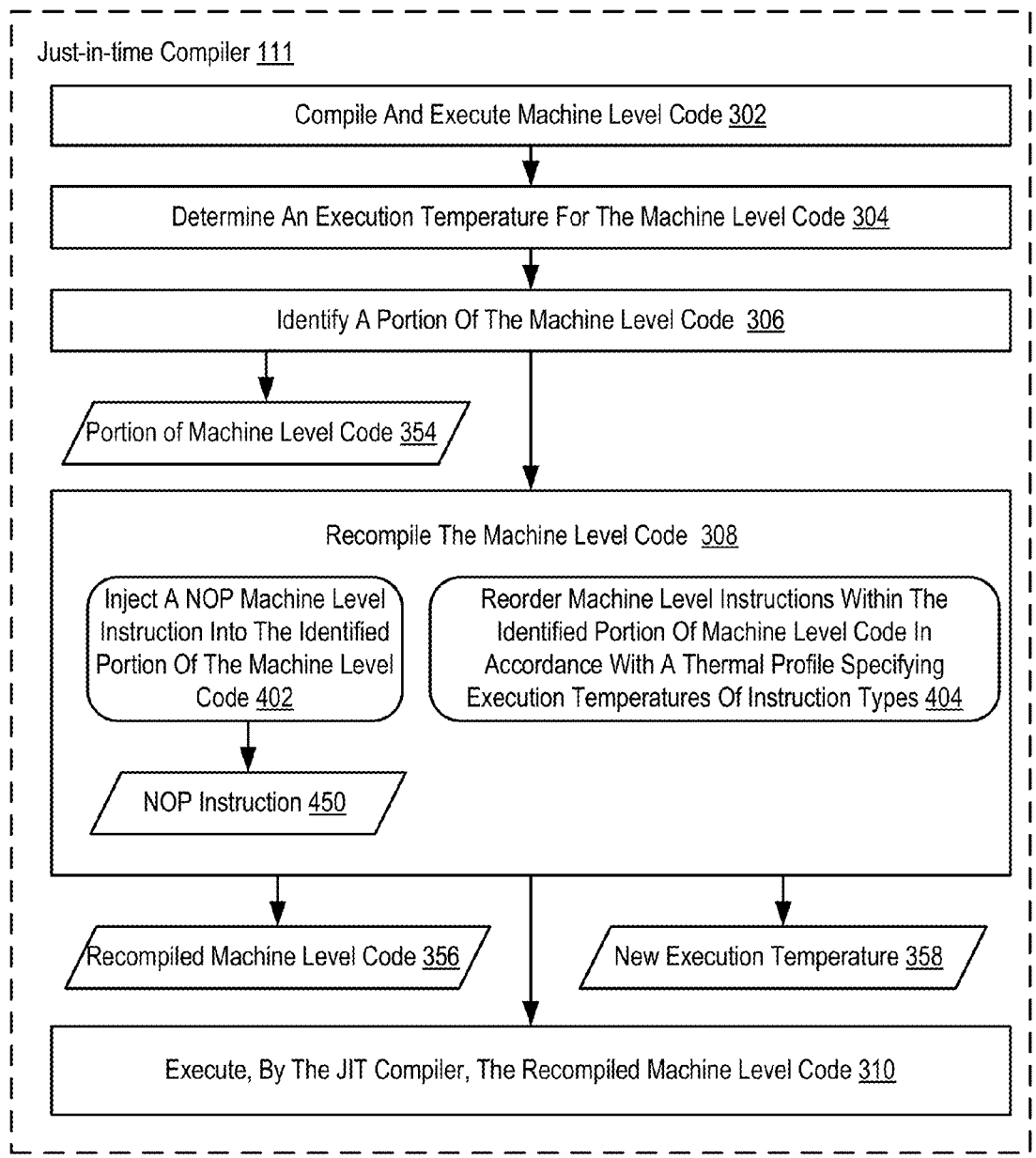
FIG. 4 sets forth a flow chart illustrating a further exemplary method for real-time temperature sensitive machine level code compilation and execution according to embodiments of the present invention.

For further explanation, FIG. 4 sets forth a flow chart illustrating a further exemplary method for real-time temperature sensitive machine level code compilation and execution according to embodiments of the present invention. The method of FIG. 4 is similar to the method of FIG. 3 in that the method of FIG. 4 also includes: compiling and executing (302) machine level code (350); during execution of the machine level code (350), determining (304) an execution temperature (352) for the machine level code (350), including reading temperature measurements from one or more processor temperature sensors; based on the determined execution temperature (352), identifying (306) a portion (354) of the machine level code (350) that, when executed, caused temperature measurements of one or more processor temperature sensors to exceed a predetermined threshold temperature (360); recompiling (308) the machine level code (350) including modifying the identified portion (354) to generate a new execution temperature (358) that is lower than the previously determined execution temperature (352); and executing (310) the recompiled machine level code (356).

In the method of FIG. 4, however, recompiling (308) the machine level code (350) including modifying the identified portion (354) to generate a new execution temperature (358) that is lower than the previously determined execution temperature (352) may optionally include injecting, by the JIT compiler, a No Operation Performed (NOP) machine level instruction into the identified portion of the machine level code. A NOP instruction is a machine level instruction that causes the processor to effectively do nothing at all. For example, some computer instruction sets include an instruction whose explicit purpose is not to change the state of any of the programmer accessible registers, status flags, or memory and which may require a specific number of clock cycles to execute. In other instruction sets, a NOP has to be simulated by executing an instruction having operands that cause the same effect. A NOP is most commonly used for timing purposes, to force memory alignment, to prevent hazards, to occupy a branch delay slot, or as a place-holder to be replaced by active instructions later on in program development (or to replace removed instructions when refactoring would be problematic or time-consuming). Because the processor does nothing at all during a NOP operation, the processor cools down. For this reason, a NOP may have a corresponding thermal profile indicating that the NOP is a 'cooling' instruction. That is, executing a NOP cools the processor. Injecting a 'NOP' machine level instruction into the identified portion of the machine level code may be carried out by adding a NOP command to one or more portions of machine level code.

In the method of FIG. 4, however, recompiling (308) the machine level code (350) including modifying the identified portion (354) to generate a new execution temperature (358) that is lower than the previously determined execution temperature (352) may optionally include reordering, by the JIT compiler, machine level instructions within the identified portion of machine level code in accordance with a thermal profile specifying execution temperatures of instruction types. Reordering machine level instructions within the identified portion of machine level code in accordance with a thermal profile specifying execution temperatures of instruction types may be carried out by examining the thermal profiles of each machine level instruction within the identified portion of the machine level code; and moving one or more machine level instructions to achieve a particular thermal effect. For example, the identified portion of machine level code may include a sequence of twenty machine level instructions that have a hot thermal profile followed by a sequence of forty machine level instructions that have a cool thermal profile. Execution of the first ten instructions in the hot sequence may result in the processor (156) reaching a predetermined temperature threshold. Therefore, the compiler may move some of the machine level instructions from the cool sequence into the hot sequence. That is, the reordered portion of machine level code may include a repeating sequence of five hot instructions followed by ten cool instructions. The interlacing of hot and cool instructions may keep the processor (156) from reaching the predetermined temperature threshold. That is, the compiler (111) utilizes a software implementation to cool the processor (156).

Figure 5:
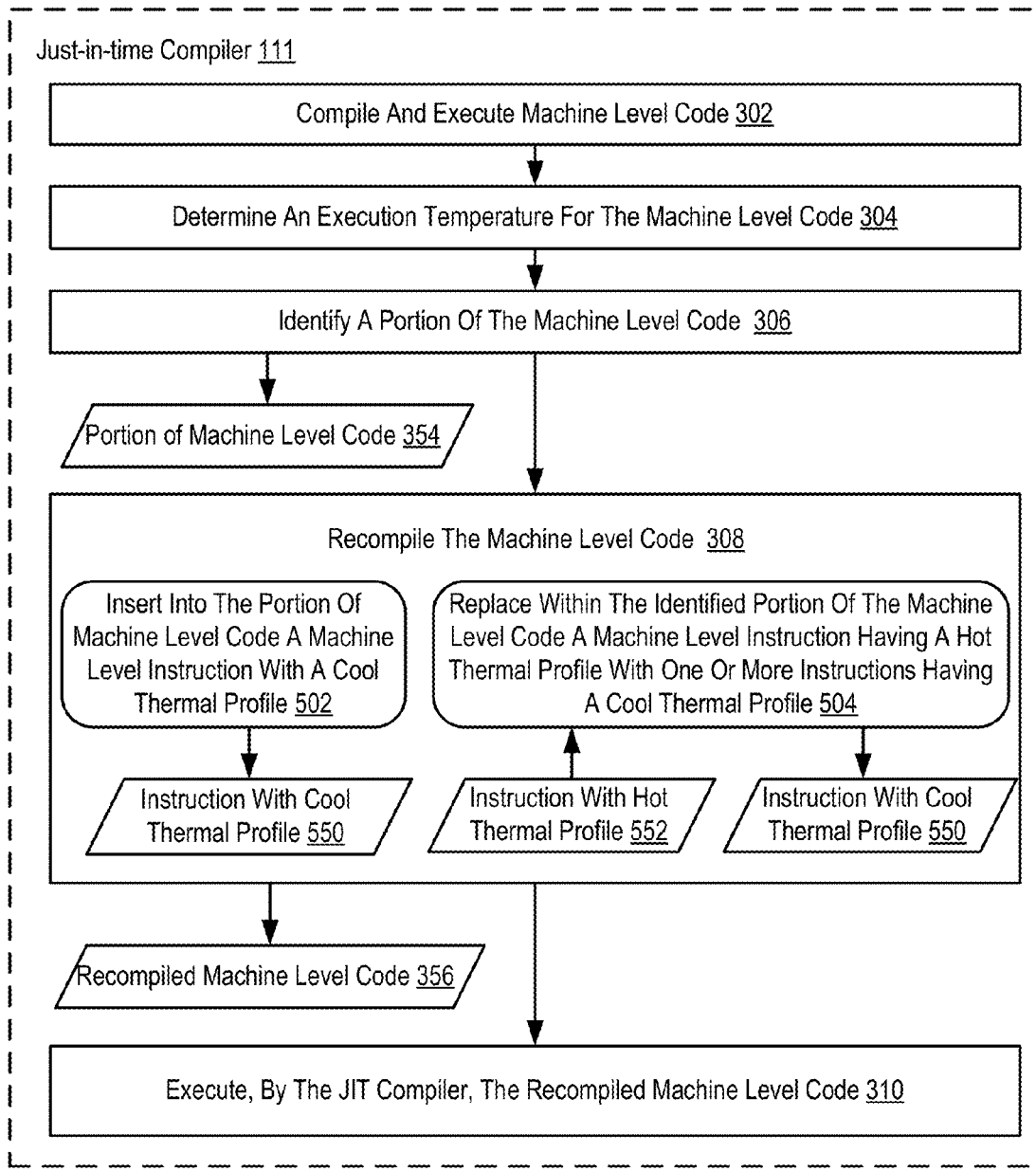
FIG. 5 sets forth a flow chart illustrating a further exemplary method for real-time temperature sensitive machine level code compilation and execution according to embodiments of the present invention.

For further explanation, FIG. 5 sets forth a flow chart illustrating a further exemplary method for real-time temperature sensitive machine level code compilation and execution according to embodiments of the present invention. The method of FIG. 5 is similar to the method of FIG. 3 in that the method of FIG. 5 also includes: compiling and executing (302) machine level code (350); during execution of the machine level code (350), determining (304) an execution temperature (352) for the machine level code (350), including reading temperature measurements from one or more processor temperature sensors; based on the determined execution temperature (352), identifying (306) a portion (354) of the machine level code (350) that, when executed, caused temperature measurements of one or more processor temperature sensors to exceed a predetermined threshold temperature (360); recompiling (308) the machine level code (350) including modifying the identified portion (354) to generate a new execution temperature (358) that is lower than the previously determined execution temperature (352); and executing (310) the recompiled machine level code (356).

In the method of FIG. 5, however, recompiling (308) the machine level code (350) including modifying the identified portion (354) to generate a new execution temperature (358) that is lower than the previously determined execution temperature (352) may optionally include inserting (502) into the portion (354) of machine level code (350), by the JIT compiler (111), a machine level instruction (550) with a cool thermal profile. Inserting (502) into the portion (354) of machine level code (350) a machine level instruction (550) with a cool thermal profile may be carried out by examining the thermal profiles of each machine level instruction within the identified portion of the machine level code; and adding one or more machine level instructions to achieve a particular thermal effect. For example, the identified portion of machine level code may include a sequence of twenty machine level instructions that have a hot thermal profile. Execution of the first ten instructions in the hot sequence may result in the processor (156) reaching a predetermined temperature threshold. Therefore, the compiler (111) may insert one or more machine level instructions that have a cool thermal profile into the hot sequence. That is, the new portion of machine level code may include a repeating sequence of five hot instructions followed by ten cool instructions. The interlacing of hot and cool instructions may keep the processor from reaching the predetermined temperature threshold. These inserted cool instructions may not be in the original identified portion of machine level code. That is, these cool instructions may be NOP or other instructions not relevant to the identified portion of machine level code.

In the method of FIG. 5, however, recompiling (308) the machine level code (350) including modifying the identified portion (354) to generate a new execution temperature (358) that is lower than the previously determined execution temperature (352) may optionally include replacing (504) within the identified portion (354) of the machine level code (350), by the JIT compiler (111), a machine level instruction (552) having a hot thermal profile with one or more machine level instructions (550) that have a cool thermal profile. Replacing (504) within the identified portion (354) of the machine level code (350) a machine level instruction (552) having a hot thermal profile with one or more machine level instructions (550) that have a cool thermal profile may be carried out by examining the thermal profiles of each machine level instruction with the identified portion of the machine level code; identifying machine level instructions with a cool thermal profile that can perform the operation of the machine level instruction with the hot thermal profile; and replacing the hot machine level instructions with the identified one or more machine level instructions with the cool thermal profile. For example, the identified portion of machine level code may include a sequence of twenty machine level instructions that perform a multiplication operation within a multiplier component. In this example, the multiplier component may generate more heat than an adder component with the processor (156). Therefore, the compiler (111) may replace the twenty machine level instructions for the multiplier component with machine level instructions that utilize the adder component. By using the 'cooler' adder component instead of the 'hot' multiplier component, the processer (156) may continue to operate without exceeding a predetermined temperature threshold and without increasing fan utilization or invoking hardware throttling.

Figure 6:
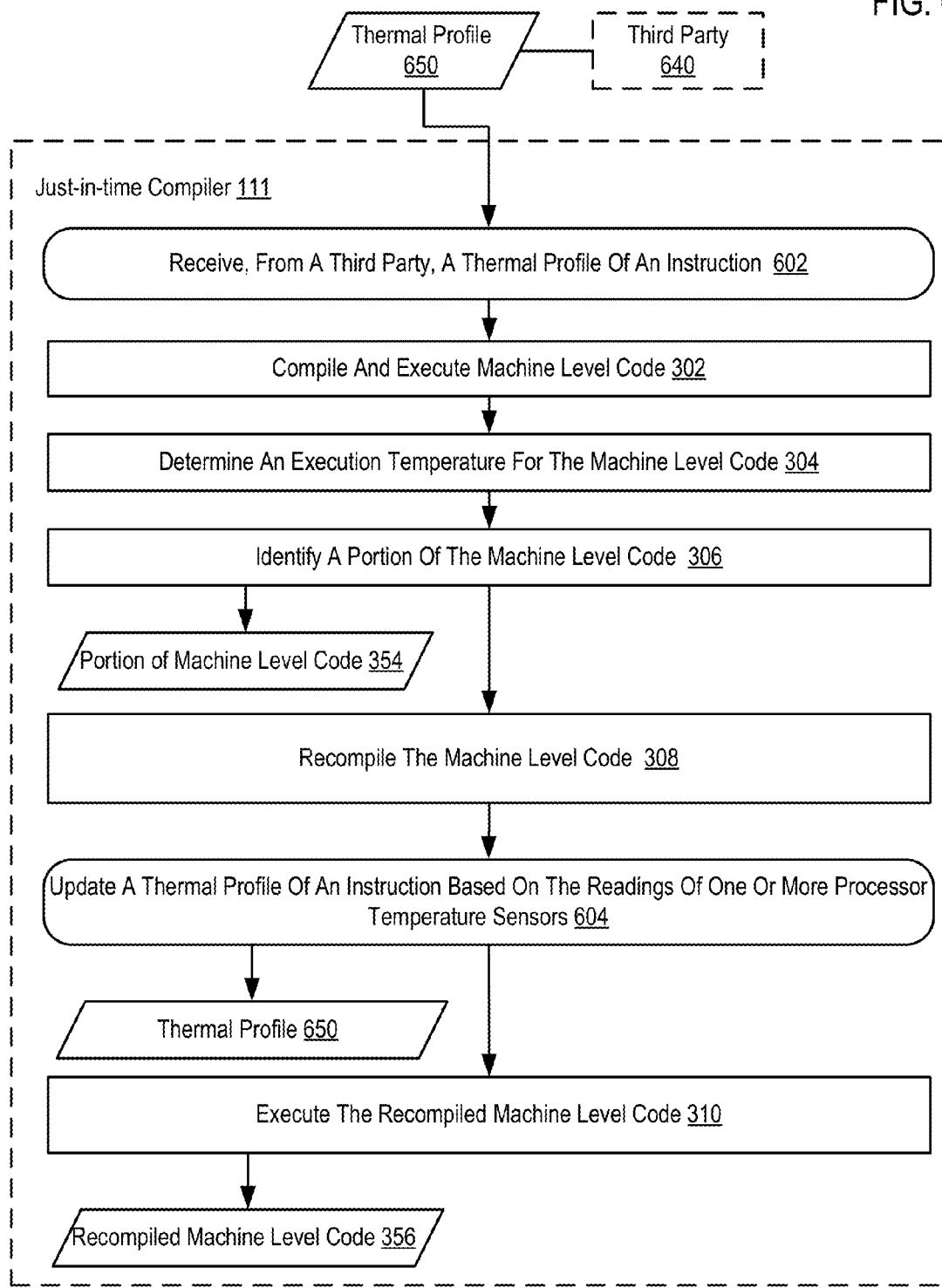
FIG. 6 sets forth a flow chart illustrating a further exemplary method for real-time temperature sensitive machine level code compilation and execution according to embodiments of the present invention.

For further explanation, FIG. 6 sets forth a flow chart illustrating a further exemplary method for real-time temperature sensitive machine level code compilation and execution according to embodiments of the present invention. The method of FIG. 6 is similar to the method of FIG. 3 in that the method of FIG. 6 also includes: compiling and executing (302) machine level code (350); during execution of the machine level code (350), determining (304) an execution temperature (352) for the machine level code (350), including reading temperature measurements from one or more processor temperature sensors; based on the determined execution temperature (352), identifying (306) a portion (354) of the machine level code (350) that, when executed, caused temperature measurements of one or more processor temperature sensors to exceed a predetermined threshold temperature (360); recompiling (308) the machine level code (350) including modifying the identified portion (354) to generate a new execution temperature (358) that is lower than the previously determined execution temperature (352); and executing (310) the recompiled machine level code (356).

The method of FIG. 6, however, may optionally include receiving (602), by the JIT compiler (111) from a third party (640), a thermal profile (650) of a machine level instruction. A third party may be any entity capable of providing a thermal profile to a compiler. Examples of third parties include a computer processor developer or a computer manufacturer.

Receiving (602), from a third party (640), a thermal profile (650) of a machine level instruction may be carried out by receiving a compiler software update or loading a thermal profile provided by a computer processor developer.

The method of FIG. 6, however, may optionally include updating (604), by the JIT compiler (111), a thermal profile (650) of a machine level instruction based on the readings of the one or more processor temperature sensors. Updating (604) a thermal profile (650) of a machine level instruction based on the readings of the one or more processor temperature sensors may be carried out by determining that a particular machine level instruction generates a different amount of heat than previously indicated in a thermal profile; and storing the new heat information within the updated thermal profile. That is, a compiler may be provided with a particular thermal profile for a machine level instruction. Upon execution of the machine level instruction, however, temperature readings may indicate that the thermal profile for the particular machine level instruction is higher or lower than indicated in the original thermal profile. In this example, the compiler (111) is configured to change the information within the thermal profile for the particular machine level instruction. The next time that the compiler uses the machine level instruction, the updated thermal profile is used. That is, the compiler updates thermal profiles in real-time.

Exemplary embodiments of the present invention are described largely in the context of a fully functional computer system for real-time temperature sensitive machine level code compilation and execution. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for real-time temperature sensitive machine level code compilation and execution, the apparatus comprising a computer processor, a computer memory operatively coupled to the computer processor, the computer memory having disposed within it computer program instructions that, when executed by the computer processor, cause the apparatus to carry out the steps of:
    compiling and executing, by a just-in-time (JIT) compiler, machine level code;
    during execution of the machine level code, determining, by the JIT compiler, an execution temperature for the machine level code, including reading temperature measurements from one or more processor temperature sensors;
    based on the determined execution temperature, identifying, by the JIT compiler, a portion of the machine level code that, when executed, caused temperature measurements of one or more processor temperature sensors to exceed a predetermined threshold temperature;
    recompiling, by the JIT compiler, the machine level code including modifying the identified portion to generate a new execution temperature that is lower than the previously determined execution temperature, wherein modifying the identified portion to generate a new execution temperature that is lower than the previously determined execution temperature includes replacing within the identified portion of the machine level code, by the JIT compiler, a machine level instruction having a hot thermal profile with one or more machine level instructions that have a cool thermal profile; and
    executing, by the JIT compiler, the recompiled machine level code.

2. The apparatus of claim 1 wherein modifying the identified portion to generate a new execution temperature that is lower than the previously determined execution temperature includes injecting, by the JIT compiler, a 'No Operation Performed' (NOP) machine level instruction into the identified portion of the machine level code.

3. The apparatus of claim 1 wherein modifying the identified portion to generate a new execution temperature that is lower than the previously determined execution temperature includes reordering, by the JIT compiler, machine level instructions within the identified portion of machine level code in accordance with a thermal profile specifying execution temperatures of instruction types.

4. The apparatus of claim 1 wherein modifying the identified portion to generate a new execution temperature that is lower than the previously determined execution temperature includes inserting into the portion of machine level code, by the JIT compiler, a machine level instruction with a cool thermal profile.

5. The apparatus of claim 1 further comprising updating, by the JIT compiler, a thermal profile of a machine level instruction based on the readings of the one or more processor temperature sensors.

6. The apparatus of claim 1 further comprising receiving, by the JIT compiler from a third party, a thermal profile of a machine level instruction.

7. A computer program product for real-time temperature sensitive machine level code compilation and execution, the computer program product disposed upon a computer readable storage medium, the computer program product comprising computer program instructions capable, when executed, of causing a computer to carry out the steps of:
    compiling and executing, by a just-in-time (JIT) compiler, machine level code;
    during execution of the machine level code, determining, by the JIT compiler, an execution temperature for the machine level code, including reading temperature measurements from one or more processor temperature sensors;
    based on the determined execution temperature, identifying, by the JIT compiler, a portion of the machine level code that, when executed, caused temperature measurements of one or more processor temperature sensors to exceed a predetermined threshold temperature;
    recompiling, by the JIT compiler, the machine level code including modifying the identified portion to generate a new execution temperature that is lower than the previously determined execution temperature, wherein modifying the identified portion to generate a new execution temperature that is lower than the previously determined execution temperature includes replacing within the identified portion of the machine level code, by the JIT compiler, a machine level instruction having a hot thermal profile with one or more machine level instructions that have a cool thermal profile; and
    executing, by the JIT compiler, the recompiled machine level code.

8. The computer program product of claim 7 wherein modifying the identified portion to generate a new execution temperature that is lower than the previously determined execution temperature includes injecting, by the JIT compiler, a 'No Operation Performed' (NOP) machine level instruction into the identified portion of the machine level code.

9. The computer program product of claim 7 wherein modifying the identified portion to generate a new execution temperature that is lower than the previously determined execution temperature includes reordering, by the JIT compiler, machine level instructions within the identified portion of machine level code in accordance with a thermal profile specifying execution temperatures of instruction types.

10. The computer program product of claim 7 wherein modifying the identified portion to generate a new execution temperature that is lower than the previously determined execution temperature includes inserting into the portion of machine level code, by the JIT compiler, a machine level instruction with a cool thermal profile.

11. The computer program product of claim 7 further comprising updating, by the JIT compiler, a thermal profile of a machine level instruction based on the readings of the one or more processor temperature sensors.

* * * * *